(12) United States Patent
Yaginiwa et al.

(10) Patent No.: US 11,303,578 B2
(45) Date of Patent: Apr. 12, 2022

(54) PACKET PROCESSING DEVICE AND NETWORK SYSTEM

(71) Applicant: FUJITSU LIMITED, Kawasaki (JP)

(72) Inventors: Ryohei Yaginiwa, Fuchu (JP); Jumpei Hongo, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/884,180

(22) Filed: May 27, 2020

(65) Prior Publication Data
US 2020/0382436 A1 Dec. 3, 2020

(30) Foreign Application Priority Data
Jun. 3, 2019 (JP) .............................. JP2019-103519

(51) Int. Cl.
| | |
|---|---|
| *H04L 12/865* | (2013.01) |
| *H04L 12/861* | (2013.01) |
| *H04L 12/851* | (2013.01) |
| *H04L 1/18* | (2006.01) |
| *H04L 47/6275* | (2022.01) |
| *H04L 49/90* | (2022.01) |
| *H04L 47/2441* | (2022.01) |

(52) U.S. Cl.
CPC ........ *H04L 47/6275* (2013.01); *H04L 1/1887* (2013.01); *H04L 47/2441* (2013.01); *H04L 49/9094* (2013.01)

(58) Field of Classification Search
None
See application file for complete search history.

(56) References Cited

U.S. PATENT DOCUMENTS

| | | | |
|---|---|---|---|
| 2018/0183708 A1* | 6/2018 | Farkas | ................... H04L 45/42 |
| 2018/0288145 A1* | 10/2018 | Levy | ..................... H04L 43/12 |
| 2019/0155532 A1* | 5/2019 | Takakura | ............. G06F 3/0635 |
| 2019/0166061 A1* | 5/2019 | Farkas | ................ H04L 47/621 |
| 2019/0199641 A1* | 6/2019 | Lo Bello | ................ H04L 47/22 |
| 2019/0215832 A1* | 7/2019 | Nishimura | ....... H04W 72/0446 |

FOREIGN PATENT DOCUMENTS

| | | |
|---|---|---|
| JP | 2018-125597 A | 8/2018 |
| JP | 2018-129661 A | 8/2018 |
| JP | 2018-133694 A | 8/2018 |
| JP | 2019-009557 A | 1/2019 |

* cited by examiner

*Primary Examiner* — Mariela Vidal Carpio
(74) *Attorney, Agent, or Firm* — Fujitsu Patent Center

(57) ABSTRACT

A packet processing device is implemented in a network that transmits priority packets and non-priority packets having a lower priority than the priority packets. The packet processing device includes: a packet storage, a gate, a controller, a detector, a generator, and a transmitter. The packet storage stores non-priority packets. The gate is provided on an output side of the packet storage. The controller controls the gate. The detector detects a transmission pattern of the priority packets. The generator generates, based on the transmission pattern of the priority packets, a gate control signal for controlling a gate of a packet processing device implemented in another node. The transmitter transmits the gate control signal to a destination of the priority packets.

5 Claims, 20 Drawing Sheets

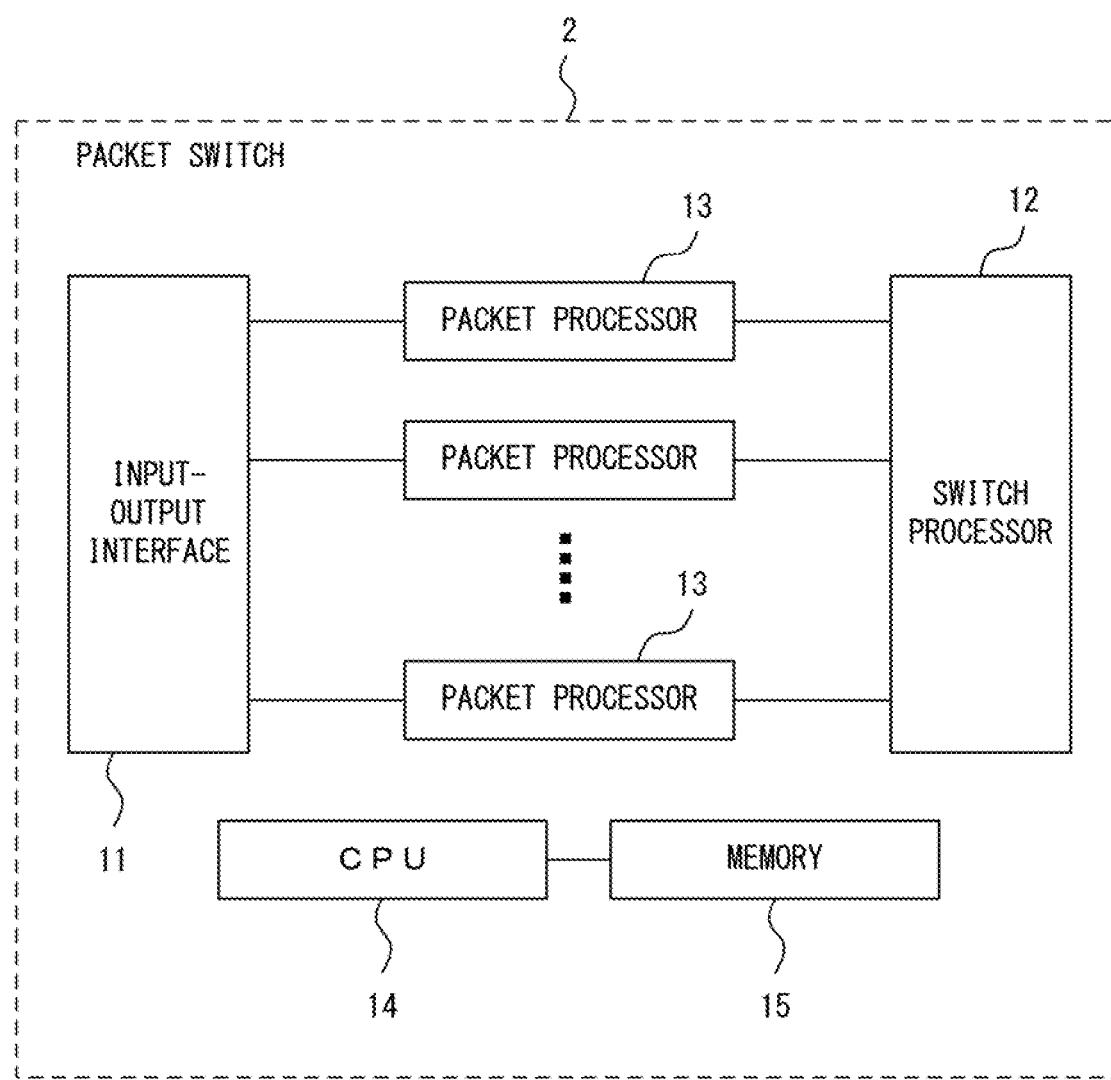
F I G. 2

33

| TS NUMBER | STATE INFORMATION (PRIORITY GATE) | STATE INFORMATION (NON-PRIORITY GATE) | RETENTION TIME ($\mu$s) |
|---|---|---|---|
| 1 | Open | Close | 10 |
| 2 | Open | Close | 20 |
| 3 | Open | Close | 10 |
| 4 | Open | Open | 5 |
| 5 | Open | Open | 5 |
| 6 | Open | Open | 15 |
| ... | ... | ... | ... |
| N | Open | Open | 15 |

33a, 33b, 33c, 33d

F I G. 4

33

| TS NUMBER | STATE INFORMATION (PRIORITY GATE) | STATE INFORMATION (NON-PRIORITY GATE) | RETENTION TIME ($\mu s$) |
|---|---|---|---|
| 1 | Open | Open | 70 |
| 2 | Open | Close | 70 |
| 3 | Open | Close | 70 |
| 4 | Open | Close | 70 |
| 5 | Open | Close | 70 |
| 6 | Open | Close | 70 |
| 7 | Open | Open | 70 |
| 8 | Open | Open | 70 |
| ⋮ | | | |
| 13 | Open | Open | 70 |
| 14 | Open | Open | 90 |

F I G. 7

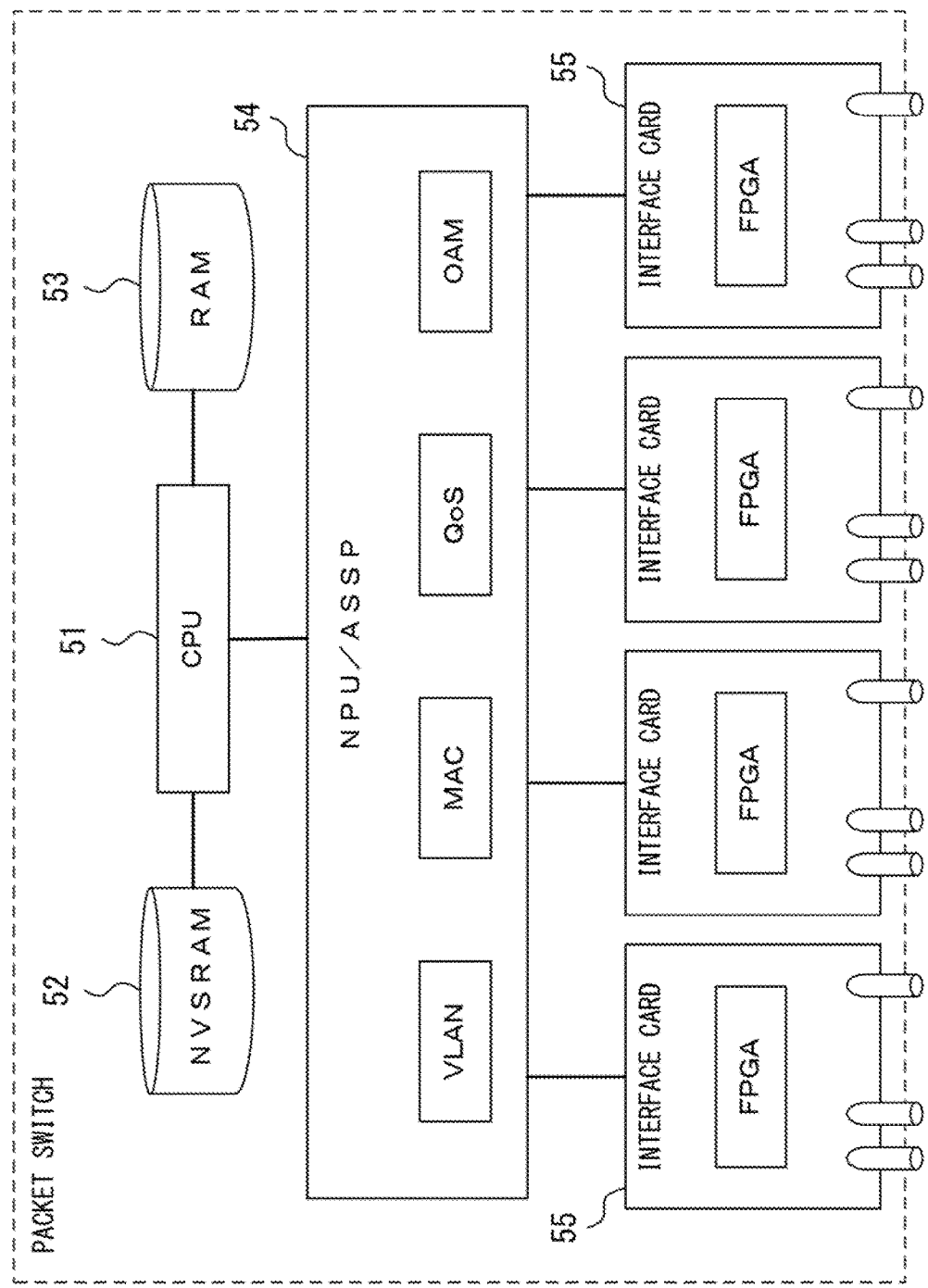
F I G. 1 1

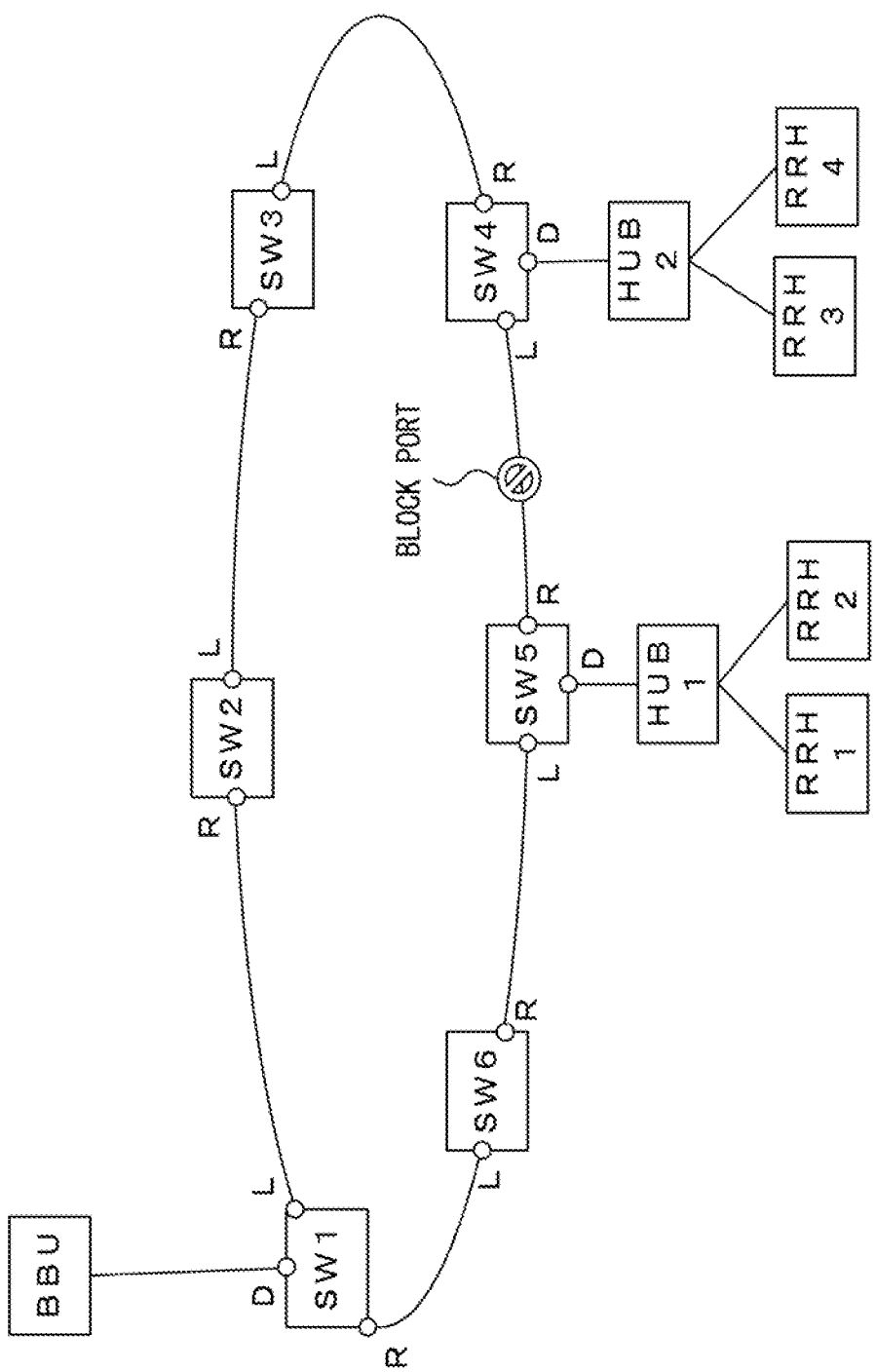
F I G. 12

<SOURCE : RRH1 (VLANID1)>

| TS NUMBER | STATE INFORMATION (PRIORITY GATE) | STATE INFORMATION (NON-PRIORITY GATE) | RETENTION TIME ($\mu$s) |
|---|---|---|---|
| 1 | Open | Open | 70 |
| 2 | Open | Open | 70 |
| 3 | Open | Close | 70 |
| 4 | Open | Close | 70 |
| 5 | Open | Open | 70 |
| 6 | Open | Open | 70 |
| 7 | Open | Open | 70 |
| 8 | Open | Open | 70 |
| ⋮ | | | |
| 13 | Open | Open | 70 |
| 14 | Open | Open | 90 |

F I G. 1 3 A

<SOURCE : RRH2 (VLANID2)>

| TS NUMBER | STATE INFORMATION (PRIORITY GATE) | STATE INFORMATION (NON-PRIORITY GATE) | RETENTION TIME ($\mu$s) |
|---|---|---|---|
| 1 | Open | Open | 70 |
| 2 | Open | Open | 70 |
| 3 | Open | Open | 70 |
| 4 | Open | Open | 70 |
| 5 | Open | Close | 70 |
| 6 | Open | Close | 70 |
| 7 | Open | Open | 70 |
| 8 | Open | Open | 70 |
| ⋮ | | | |
| 13 | Open | Open | 70 |
| 14 | Open | Open | 90 |

F I G. 1 3 B

<PORT L (SOURCE : RRH1 + RRH2)>

| TS NUMBER | STATE INFORMATION (PRIORITY GATE) | STATE INFORMATION (NON-PRIORITY GATE) | RETENTION TIME ($\mu s$) |
|---|---|---|---|
| 1 | Open | Open | 70 |
| 2 | Open | Open | 70 |
| 3 | Open | Close | 70 |
| 4 | Open | Close | 70 |
| 5 | Open | Close | 70 |
| 6 | Open | Close | 70 |
| 7 | Open | Open | 70 |
| 8 | Open | Open | 70 |
| ... | | | |
| 13 | Open | Open | 70 |
| 14 | Open | Open | 90 |

FIG. 14

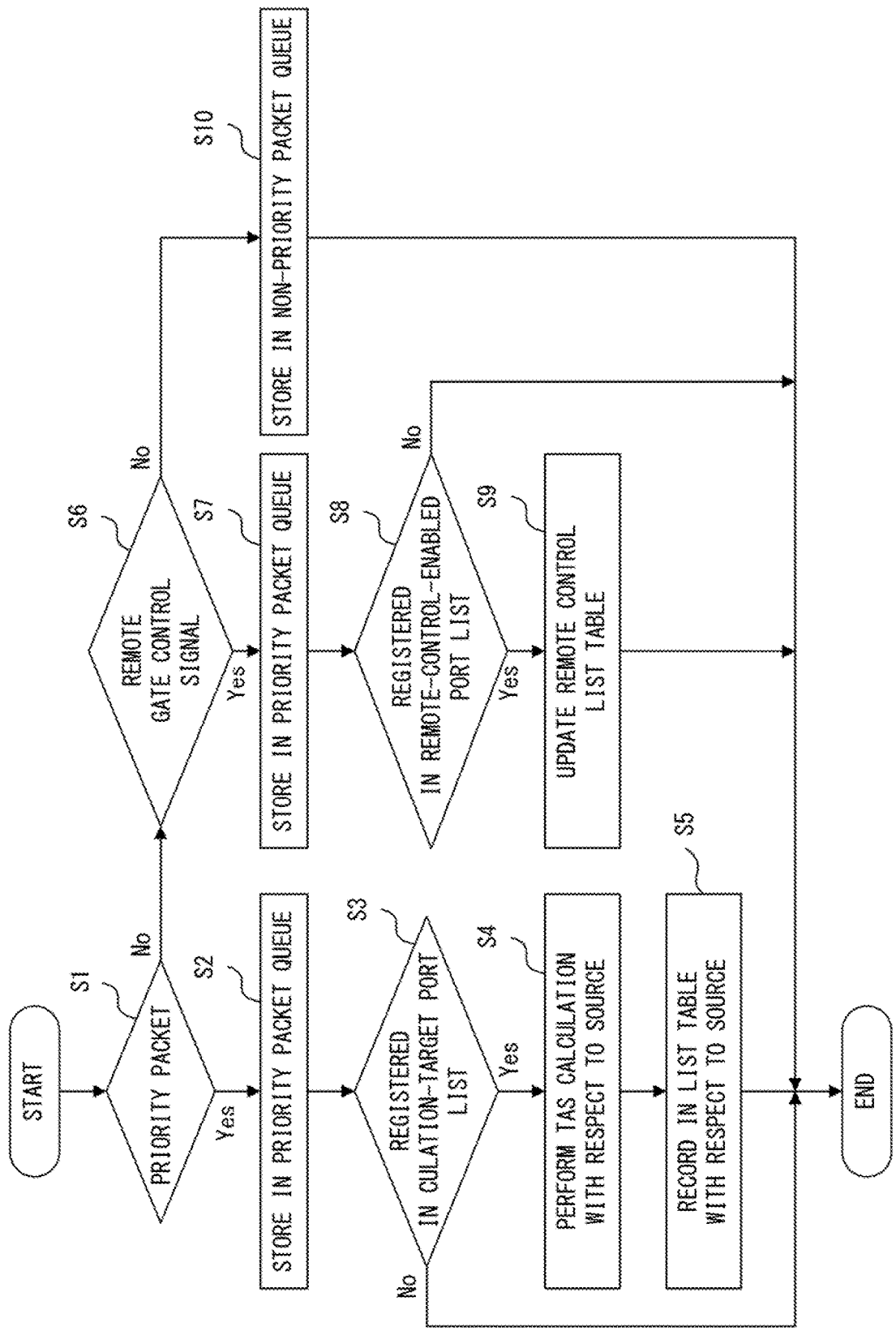
F I G. 15

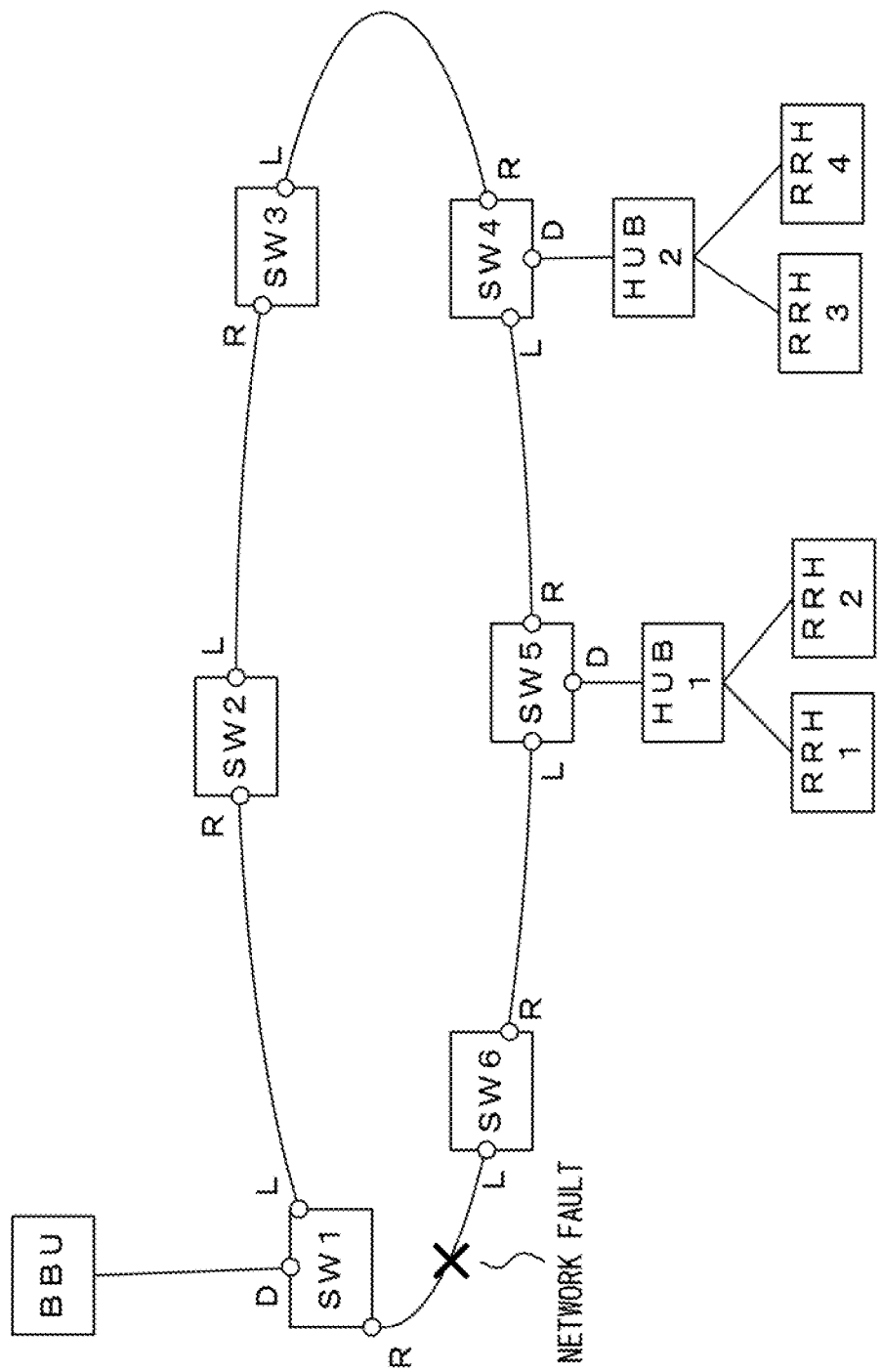
F I G. 18

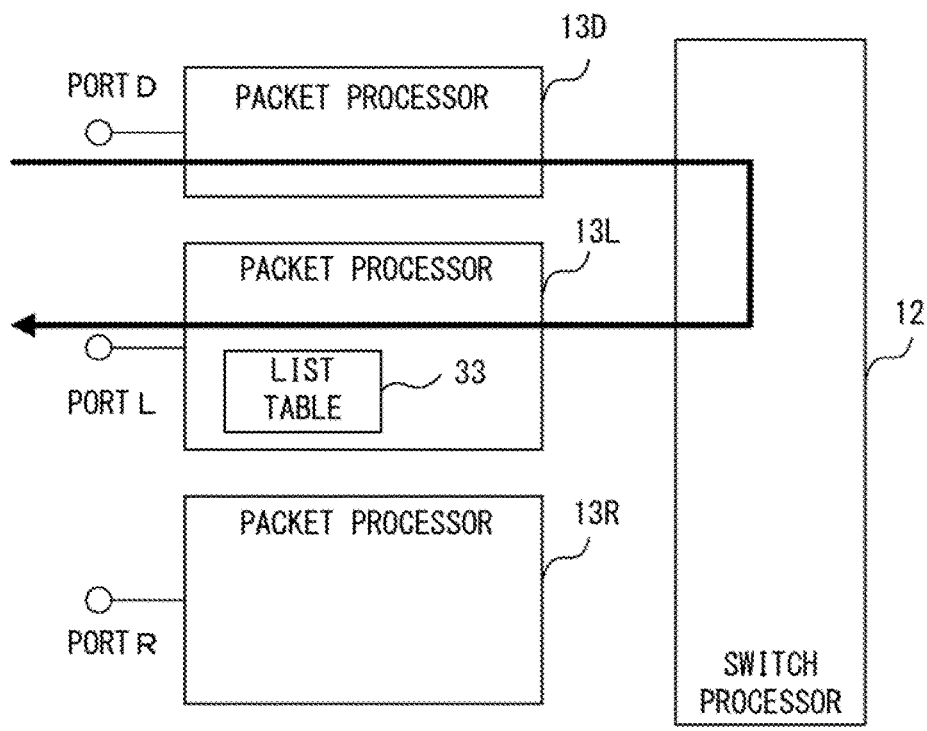
F I G. 1 9 A
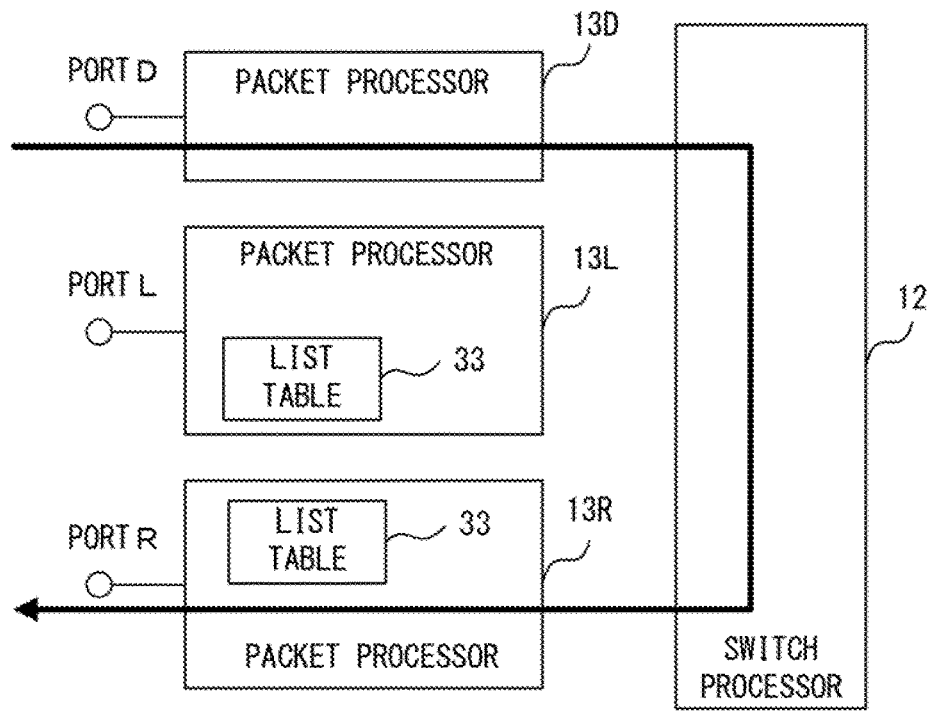
F I G. 1 9 B

PACKET PROCESSING DEVICE AND NETWORK SYSTEM

CROSS-REFERENCE TO RELATED APPLICATION

This application is based upon and claims the benefit of priority of the prior Japanese Patent Application No. 2019-103519, filed on Jun. 3, 2019, the entire contents of which are incorporated herein by reference.

FIELD

The embodiments discussed herein are related to a device for processing packets and a network system that transmits packets.

BACKGROUND

In recent years, mobile front haul (MFH) networks in which base station devices (BBUs: base band units) and radio antenna stations (RRHs: remote radio heads) are separated from each other have been considered as one technique for implementing the fifth-generation mobile communication system (5G). In an MFH network, signals for radio communications are transmitted between a base station device and radio antenna stations. The base station device may be connected to a plurality of radio antenna stations.

The MFH network transmits layer-2 packets. Thus, paths for the MFH network and paths for another network (e.g., a mobile back haul (MBH) network or a wired network) may share communication resources. Accordingly, the communication resources are used efficiently.

However, strict requirements pertaining to delay need to be satisfied in MFH networks in comparison with other networks. Thus, priority control has been proposed wherein the processing of packets transmitted over the MFH network is prioritized over the processing of packets transmitted over other networks. A packet transmitted over the MFH network may hereinafter be referred to as a "MFH packet" or a "priority packet (high-priority packet)". A packet transmitted over another network may hereinafter be referred to as a "non-MFH packet" or a "non-priority packet (low-priority packet)".

For example, a Time Aware Shaper (TAS) may perform gate control for non-MFH packets. In particular, a TAS is implemented in each node in the network and includes a gate and a function for controlling the gate. When MFH packets are forwarded, the TAS stops the output (or forwarding) of non-MFH packets by closing the gate. In this case, the non-MFH packets are stored in a buffer. When the forwarding of the MFH packets has been finished, the gate is opened, and the non-MFH packets stored in the buffer are output. This function reduces a delay of the MFH packets. Note that the TAS is defined by IEEE802.1QBv.

Japanese Laid-open Patent Publication No. 2018-125597 describes a packet processing device that reduces a delay in output of high-priority packets. Relevant techniques are described in Japanese Laid-open Patent Publication No. 2019-009557, Japanese Laid-open Patent Publication No. 2018-129661, and Japanese Laid-open Patent Publication No. 2018-133694.

As described above, when MFH packets are forwarded via a node, a TAS stops the output of non-MFH packets by closing the gate. In many cases, MFH packets are transmitted on a specified cycle. Accordingly, a proposed method is one wherein each node in an MFH network learns the transmission pattern of MFH packets so as to create in advance gate control information for controlling gates. However, a large load will be caused in the process of learning the transmission pattern of MFH packets so as to create gate control information. In particular, MFH packets could be delayed when each node recreates gate control information for the switching of routes between the base station device and the radio antenna stations.

SUMMARY

According to an aspect of the embodiments, a packet processing device is implemented in a network that transmits priority packets and non-priority packets having a lower priority than the priority packets. The packet processing device includes: a packet storage that stores non-priority packets; a gate that is provided on an output side of the packet storage; a controller that controls the gate; a detector that detects a transmission pattern of the priority packets; a generator that generates, based on the transmission pattern of the priority packets, a gate control signal for controlling a gate of a packet processing device implemented in another node; and a transmitter that transmits the gate control signal to a destination of the priority packets.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 illustrates an example of a packet switch;
FIG. 4 illustrates an example of a list table;
FIG. 7 illustrates an example of a list table created according to statistical information depicted in FIG. 6;
FIG. 11 illustrates an example of the hardware configuration of a packet switch;
FIG. 12 illustrates a network system in accordance with first example;
FIGS. 13A and 13B illustrate examples of list tables created by a SW5 depicted in FIG. 12;
FIG. 14 illustrates another example of a list table created by a SW5 depicted in FIG. 12;
FIG. 15 is a flowchart illustrating an example of a packet reception process;
FIG. 18 illustrates a network system in accordance with a second example;

FIGS. 19A and 19B illustrate examples of operations performed by an input-side edge node when route switching is carried out.

DESCRIPTION OF EMBODIMENTS

Figure 1:
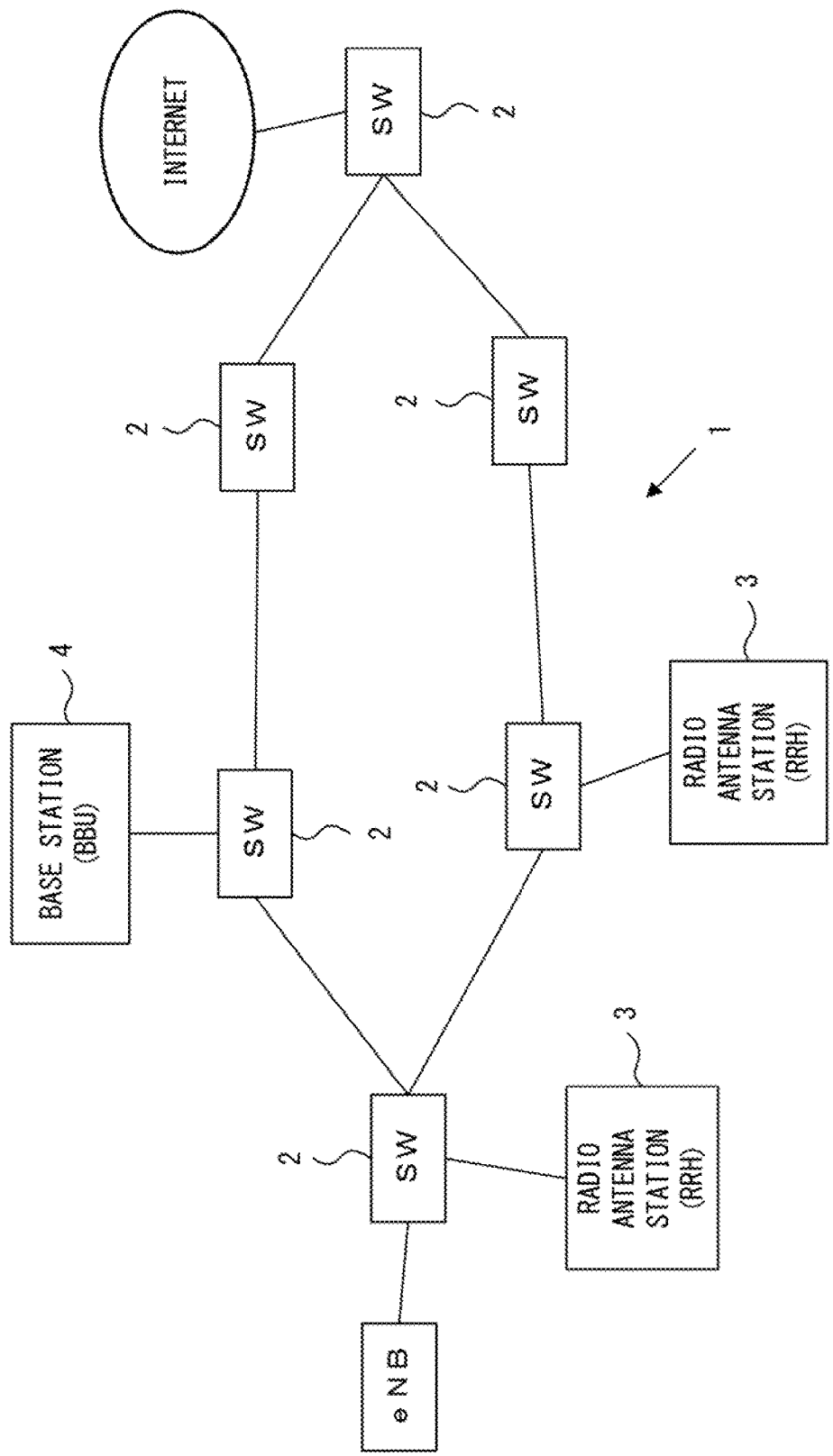
FIG. 1 illustrates an example of a relay network.

FIG. 1 illustrates an example of a relay network in accordance with an embodiment of the present invention. A packet switch 2 is implemented in each node in a relay network 1. Each of the packet switches 2 relays layer-2 packets.

The relay network 1 may accommodate any line for transmitting layer-2 packets. In this example, the relay network 1 accommodates MFH lines established between radio antenna stations (RRHs) 3 and a base station (BBU) 4. The radio antenna station 3 may accommodate one or more radio terminals. The base station 4 schedules radio resources between the radio antenna stations 3 and the radio terminals. MFH packets storing information or data are transmitted between the radio antenna stations 3 and the base station 4. Paths established between the radio antenna stations 3 and the base station 4 may hereinafter be referred to as "MFH lines".

The relay network 1 may also accommodate lines other than MFH lines. For example, the relay network 1 may accommodate MBH lines and lines for transmitting information or data of another wired network. Packets transmitted via lines other than MFH lines may hereinafter be referred to as "non-MFH packets".

Requirements pertaining to delay of MFH packets are stricter than those for non-MFH packets. Thus, the packet switch 2 has a priority control function for prioritizing the processing of MFH packets over the processing of non-MFH packets.

FIG. 2 illustrates an example of the packet switch 2. The packet switch 2 includes an input-output interface 11, a switch processor 12, a plurality of packet processors 13, a CPU 14, and a memory 15. The packet switch 2 may also include other circuits or functions that are not depicted in FIG. 2.

The input-output interface 11 provides an interface for connecting to the relay network 1. The input-output interface 11 may include input ports and output ports to which optical fibers are to be connected. The input-output interface 11 may include a function for terminating a layer-2 signal.

The switch processor 12 guides a packet received via the input-output interface 11 to a packet processor 13 that corresponds to a destination. As an example, the switch processor 12 may guide a received packet to a packet processor 13 connected to a corresponding output port according to a VLANID and/or a destination address stored in the header of the received packet. The switch processor 12 performs a switch process based on an instruction and information received from the CPU 14.

Each of the packet processors 13 performs priority control for MFH packets according to an instruction and information received from the CPU 14. The CPU 14 controls operations of the packet switch 2 by executing a program stored in the memory 15. The memory 15 includes a nonvolatile memory and stores the program to be executed by the CPU 14. The memory 15 also stores information and data to be used by the CPU 14. A portion of the memory 15 may be provided outside the packet switch 2.

Figure 3:
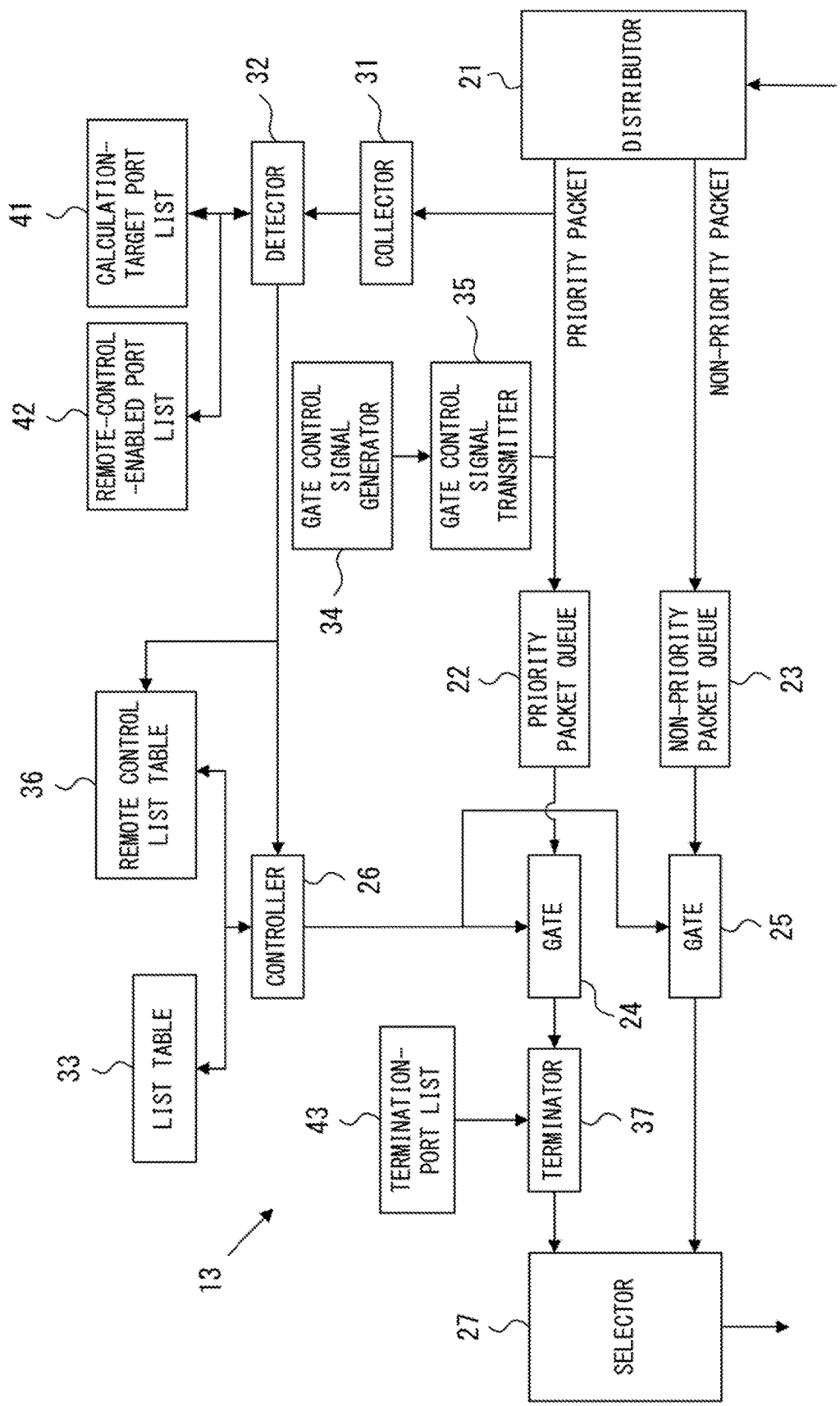
FIG. 3 illustrates an example of a packet processor.

FIG. 3 illustrates an example of the packet processor 13. The packet processor 13 includes functions depicted in FIG. 3. However, the packet processor 13 may further include functions that are not depicted in FIG. 3.

A distributor 21 refers to header information of a received packet and decides whether the received packet is a priority packet or a non-priority packet. For example, the type of the packet (in this example, whether the packet is a priority packet) may be identified using a VLANID. A priority packet is stored in a priority packet queue 22, and a non-priority packet is stored in a non-priority packet queue 23. An MFH packet is an example of a priority packet. Packets other than MFH packets are examples of non-priority packets. The priority packet queue 22 and the non-priority packet queue 23 are each implemented by a buffer memory.

A priority packet gate 24 is provided on an output side of the priority packet queue 22. A non-priority packet gate 25 is provided on an output side of the non-priority packet queue 23. A controller 26 controls states of the priority packet gate 24 and the non-priority packet gate 25. The controller 26 ordinarily maintains the priority packet gate 24 in an open state. The controller 26 closes the non-priority packet gate 25 when a priority packet is read from the priority packet queue 22 and output. A selector 27 outputs a packet passing through the priority packet gate 24 or the non-priority packet gate 25. In this way, the priority control for packets is realized.

In many cases, MFH packets (i.e., priority packets) are transmitted in a specified pattern between the radio antenna stations (RRHs) 3 and the base station (BBU) 4 depicted in FIG. 1. Accordingly, the packet processor 13 includes a function for learning the transmission pattern of MFH packets and creating control information for controlling the gates according to a result of the learning.

Control information is created by a collector 31 and a detector 32 and stored in a memory that the packet processor 13 can access. In the example depicted in FIG. 3, control information is stored as a list table 33.

FIG. 4 illustrates an example of the list table 33. In this example, the list table 33 manages TS numbers 33a, state information 33b and 33c, and retention time information 33d. A TS number 33a identifies a time slot for a received packet. State information 33b indicates the state (open/close) of the priority packet gate 24 for a time slot identified by a corresponding TS number 33a. State information 33c indicates the state (open/close) of the non-priority packet gate 25 for a time slot identified by a corresponding TS number 33a. Retention time information 33d indicates a time period allocated to a time slot identified by a corresponding TS number 33a.

The controller 26 controls the states of the priority packet gate 24 and the non-priority packet gate 25 in accordance with the list table 33. For example, the controller 26 may open the priority packet gate 24 and close the non-priority packet gate 25 in time slot TS1. In this case, even when a non-priority packet is stored in the non-priority packet queue 23, the packet processor 13 does not output the non-priority packet. Similarly, the controller 26 controls the states of the priority packet gate 24 and the non-priority packet gate 25 in each of time slots TS2-TSN. In addition, the controller 26 repeatedly performs gate control based on the list table 33.

Figure 5:
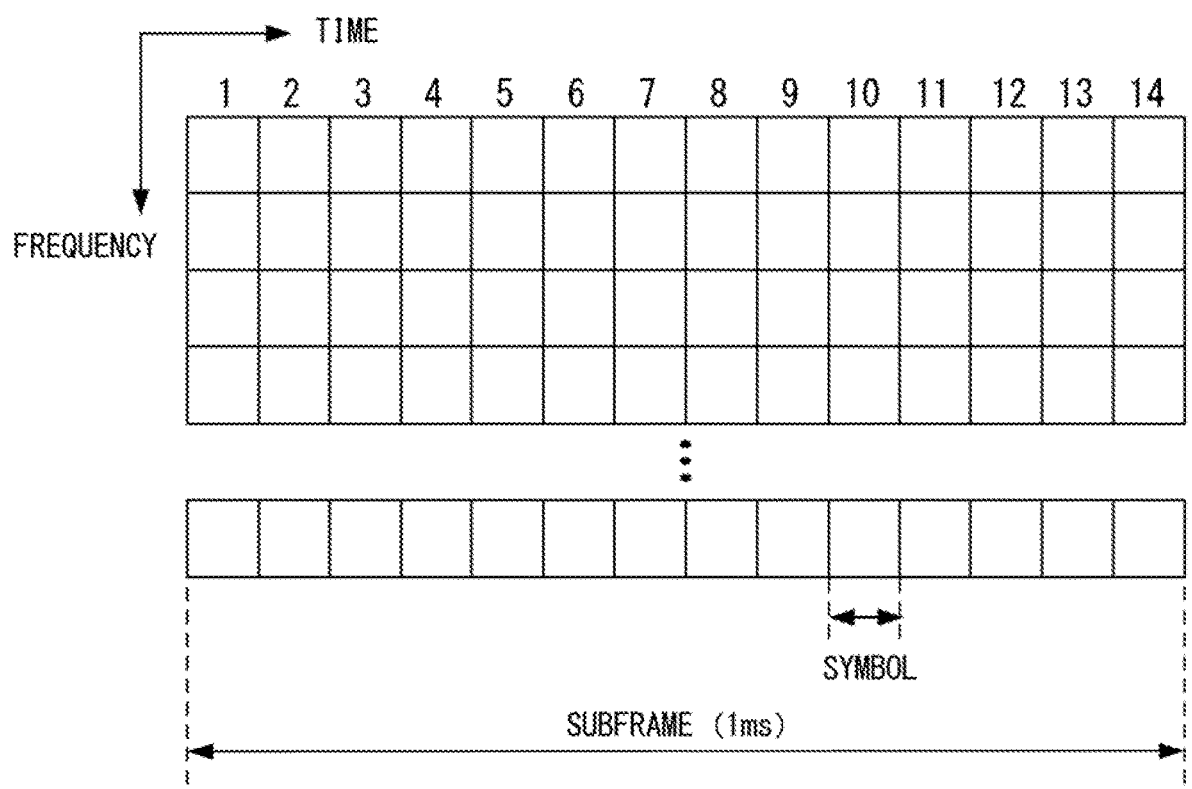
FIG. 5 illustrates an example of the configuration of a subframe.

Next, descriptions are given of an example of a method for creating the list table 33. The following descriptions are based on the assumption that subframes depicted in FIG. 5 are transmitted between the radio antenna station 3 and the radio terminal (for example, UE (User Equipment)). The subframe has a length of one millisecond. The subframe includes fourteen symbols. The subframe uses a plurality of subcarriers.

MFH data is transmitted using the subframe. Thus, in this example, MFH data is transmitted on a one-millisecond cycle. MFH data is transmitted using one or more radio resources in each sub frame. Each radio resource is configured by a combination of one symbol and one subcarrier. When the above-described subframes are transmitted between the radio antenna station 3 and the radio terminal, one or more MFH packets are transmitted between the base station 4 and the radio antenna station 3 on a one-millisecond cycle.

The packet switch 2 on a route between the base station 4 and the radio antenna station 3 forwards MFH packets as priority packets. In this case, in the packet processor 13, the MFH packets are stored in the priority packet queue 22 and guided to the collector 31. The collector 31 collects statistical information of priority packets arriving at the packet switch 2. In this example, the statistical information indicates a received-packet amount for each time slot. For example, the packet amount may be expressed as a number of packets or a number of bytes. The detector 32 analyzes the statistical information collected by the collector 31 and detects the transmission pattern of priority packets. The transmission pattern indicates intervals at which the priority packets arrive (i.e., transmission cycle). The transmission pattern may indicate time slots in which the priority packets are transmitted. In addition, the transmission pattern may indicate an average arrival amount and fluctuations in burst traffic for the priority packets.

Figure 6:
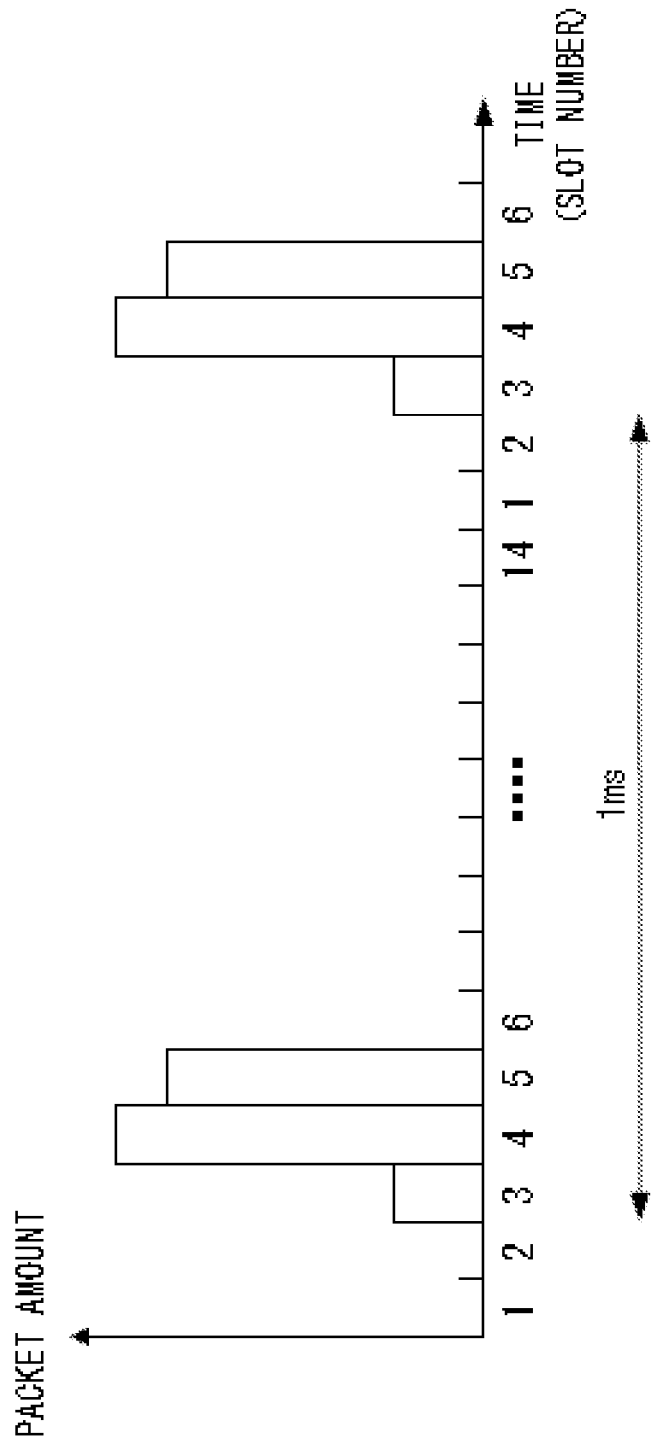
FIG. 6 illustrates an example of statistical information pertaining to received packets.

FIG. 6 illustrates an example of statistical information pertaining to received packets. In FIG. 6, a vertical axis indicates a packet amount, and a horizontal axis indicates time. Time is expressed in units of time slots. In this example, MFH packets are transmitted on a one-millisecond cycle. MFH packets are detected in time slots TS3-TS5 in each subframe.

The detector 32 analyzes the above-described statistical information and detects the transmission pattern of received packets. The detector 32 creates the list table 33 by using a result of the detection.

FIG. 7 illustrates an example of the list table 33 created according to the statistical information depicted in FIG. 6. In this example, MFH packets are detected in time slots TS3-TS5 in each subframe, as described above. Accordingly, in this case, the state of the non-priority packet gate 25 is set to "close" for time slots TS3-TS5. "Close" is also set for time slots TS2 and TS6 serving as margin periods.

The controller 26 controls the states of the priority packet gate 24 and the non-priority packet gate 25 in accordance with the list table 33. Thus, when the list table 33 depicted in FIG. 7 is created, the non-priority packet gate 25 is placed in a closed state in time slots TS2-TS6. Accordingly, in time slots TS2-TS6, non-priority packets are stopped being output, thereby realizing the priority control for MFH packets.

Figure 8A:
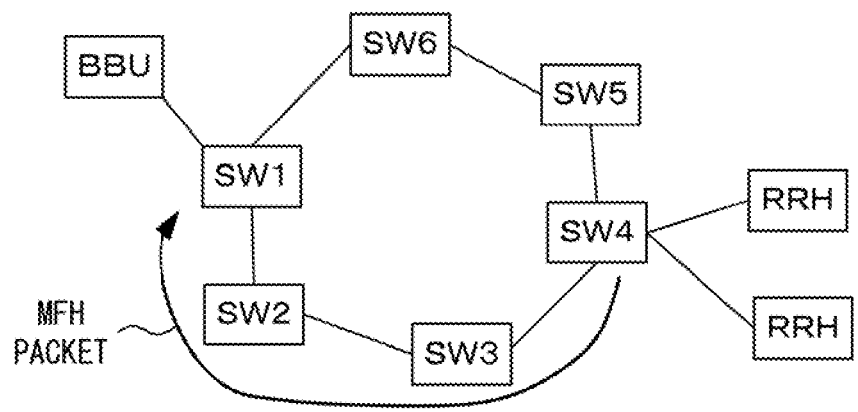
FIGS. 8A and 8B illustrate examples of the switching of communication routes.
Figure 8B:
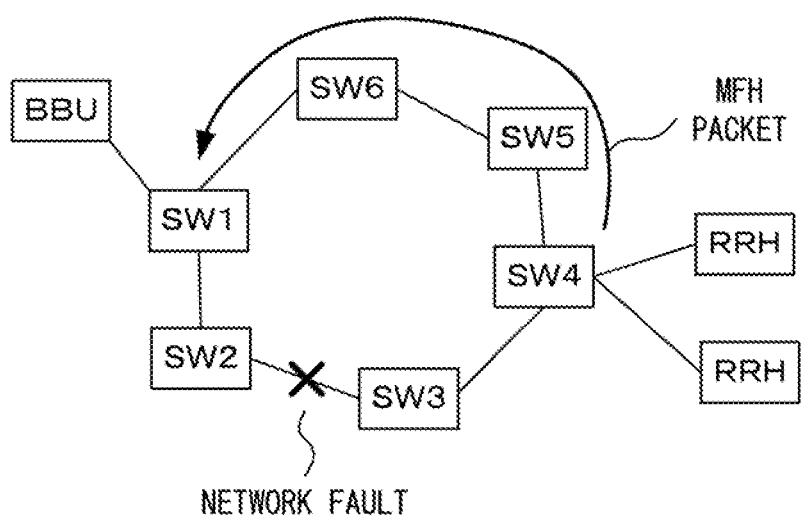

However, if all of the nodes in the relay network create list tables 33, the CPU resources of the nodes will be consumed. For example, in the cases depicted in FIGS. 8A and 8B, all nodes (SW1-SW6) calculate intervals at which MFH packets arrive. If a fault occurs in a route through which MFH packets are transmitted, each node will need to perform recalculation. For example, in the case depicted in FIG. 8A, MFH packets are transmitted from radio antenna stations RRH to a base station BBU via nodes SW4, SW3, SW2, and SW1. If, for example, a fault occurs between the nodes SW2 and SW3, as depicted in FIG. 8B, path switching may be performed. In this case, each node (at least the nodes SW4, SW5, SW6, and SW1) calculates intervals at which MFH packets arrive.

As described above, if all of the nodes in the relay network create list tables 33, the CPU resources of the nodes will be consumed. Accordingly, the network system in accordance with embodiments of the invention includes functions for solving or reducing such problems.

Figure 9:
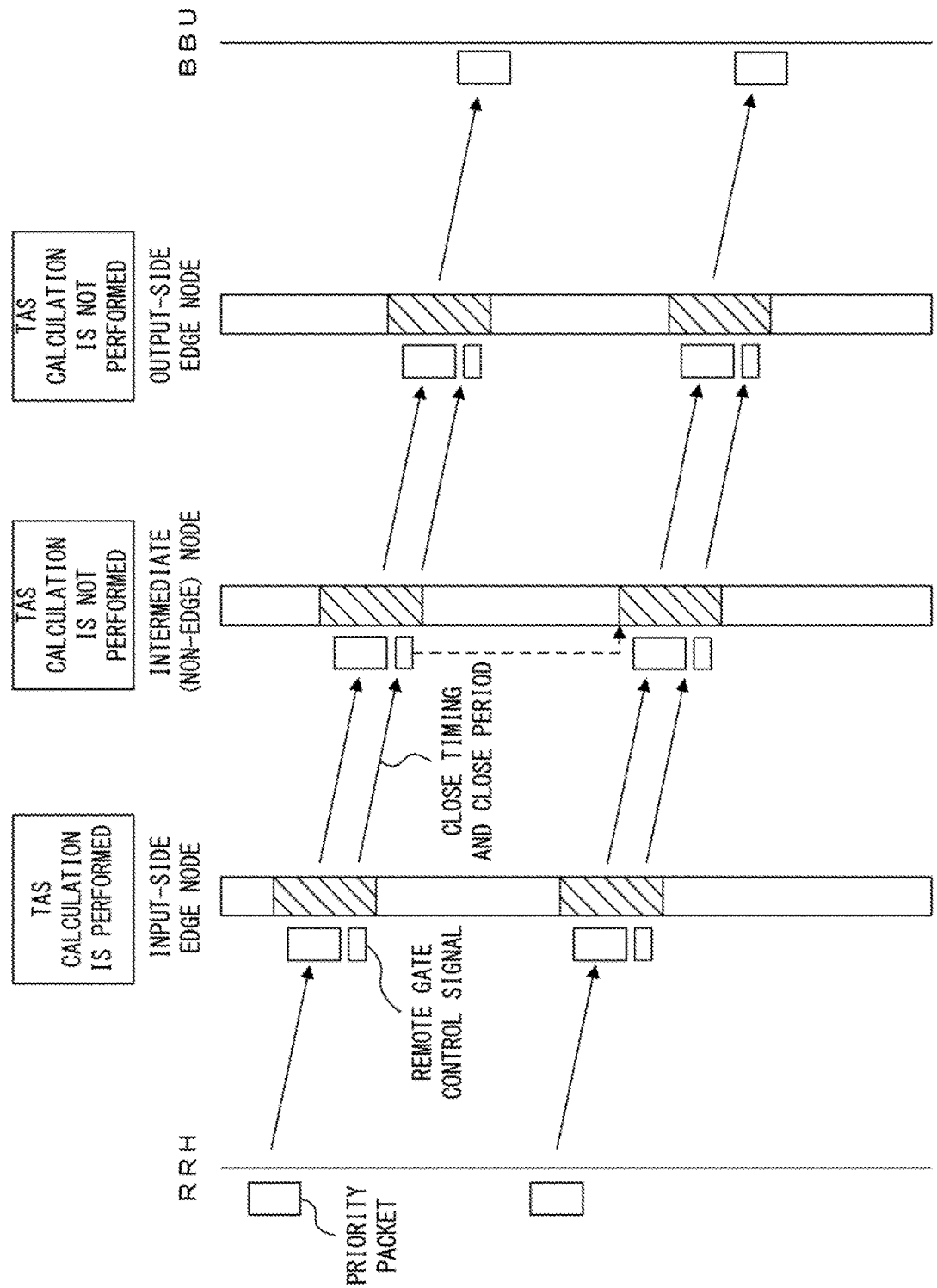
FIG. 9 illustrates an example of remote gate control.

FIG. 9 illustrates an example of remote gate control in a relay network in accordance with embodiments of the invention. In this example, priority packets are transmitted from a radio antenna station (RRH) to a base station (BBU) via a plurality of nodes. For example, the priority packets may be MFH packets. The packet switch 2 depicted in FIG. 3 is implemented in each node.

A node connected to the RRH without intervention of other nodes may hereinafter be referred to as an "input-side edge node". A node connected to the BBU without intervention of other nodes may hereinafter be referred to as an "output-side edge node". Another node implemented on a path between the RRH and the BBU may be referred to as an "intermediate node" or "non-edge node".

In the network system, priority packets transmitted from an RRH arrive at an input-side edge node. The input-side edge node detects the transmission pattern of the priority packets, as described above by referring to FIGS. 6-7. Specifically, the collector 31 and the detector 32 depicted in FIG. 3 detect the transmission pattern of the priority packets by analyzing, for example, intervals at which the priority packets arrive, thereby creating the list table 33. As a result, the input-side edge node can perform gate control for non-priority packets according to the list table 33. A process of detecting the transmission pattern of priority packets may hereinafter be referred to as "TAS calculation".

The input-side edge node generates a remote gate control signal to report a result of the TAS calculation to other nodes. In particular, in the input-side edge node, a gate control signal generator 34 generates a remote gate control signal for reporting a result of the TAS calculation to the other nodes. In this example, the remote gate control signal includes timing information indicating a timing for starting to close the non-priority packet gate 25 and period information indicating a period for closing the non-priority packet gate 25.

A gate control signal transmitter 35 transmits the remote gate control signal to the same destination as that of corresponding priority packets (in this example, a BBU). In this case, the remote gate control signal is transmitted following the transmission of the priority packets. The remote gate control signal may preferably be transmitted at the end of the period in which the non-priority packet gate 25 is closed. Alternatively, the remote gate control signal may be inserted into the corresponding priority packet and transmitted.

An example of generation of a remote gate control signal is indicated in the following. The following descriptions are based on the assumption that the list table 33 depicted in FIG. 7 is created according to the statistical information depicted in FIG. 6. In this case, the controller 26 closes the non-priority packet gate 25 in time slots TS2-TS6. Accordingly, the closing of the non-priority packet gate 25 ends at time slot TS6. The gate control signal transmitter 35 transmits a remote gate control signal in time slot TS6. After time slot TS6, the non-priority packet gate 25 is maintained in the open state.

Then, in a time slot TS2 for a next subframe, the non-priority packet gate 25 is controlled to be placed in the closed state. That is, the non-priority packet gate 25 is controlled to be placed in the closed state 650 microseconds after the transmission of the remote gate control signal. Hence, the timing information indicating a timing for starting to close the non-priority packet gate 25 is "after 650 microseconds (after nine time slots)". The non-priority packet gate 25 is maintained in the closed state in time slots TS2-TS6. Hence, the period information indicating a period for closing the non-priority packet gate 25 is "350 microseconds (five time slots)".

An intermediate node receives the priority packets and the remote gate control signal. Thus, the controller 26 of the intermediate node controls the non-priority packet gate 25 in accordance with the received remote gate control signal. Accordingly, the controller 26 starts to close the non-priority packet gate 25 at a time indicated by the timing information. The controller 26 maintains the non-priority packet gate 25 in the closed state until the end of the period indicated by the period information. In this case, the intermediate node forwards the priority packets and the remote gate control signal to a next node. Then, the controller 26 opens the non-priority packet gate 25. Note that portions represented using oblique lines in FIG. 9 indicate that non-priority packet gates 25 are closed.

An intermediate node may create a list table in accordance with the received remote gate control signal. In this case, in the example depicted in FIG. 3, the list table is stored in a memory as a remote control list table 36. The controller 26 may control the non-priority packet gate 25 in accordance with the remote control list table 36. The information contained in the remote control list table 36 is substantially the same as the information in the list table 33 created by the input-side edge node.

Priority packets and a remote gate control signal are forwarded by one or more intermediate nodes and arrive at output-side edge nodes. As with the intermediate nodes, each output-side edge node controls the non-priority packet gate 25 in accordance with the remote gate control signal. However, in the output-side edge node, a terminator 37 depicted in FIG. 3 terminates the remote gate control signal. Accordingly, the remote gate control signal is not forwarded to the BBU.

As described above, in the network system in accordance with embodiments of the invention, only the input-side edge nodes perform TAS calculation, and a remote gate control signal indicating a result of the calculation is sent to the intermediate nodes and the output-side edge nodes. Hence, the consumption of CPU resources in the entirety of the network system is reduced in comparison with configurations in which nodes each perform TAS calculation.

Figure 10:
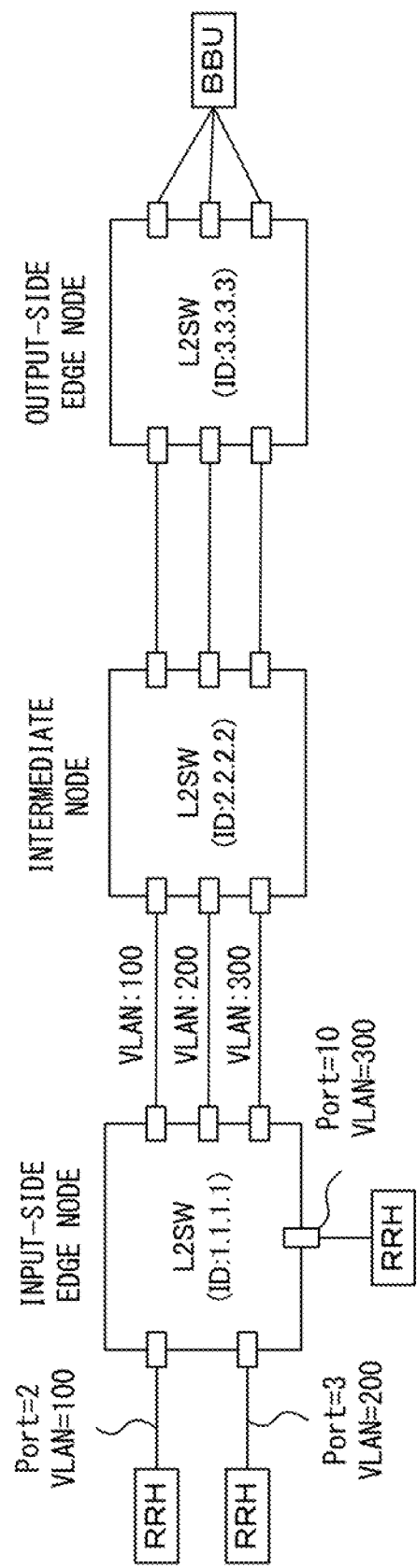
FIG. 10 illustrates an example of a transmission of a remote gate control signal.

FIG. 10 illustrates an example of a transmission of a remote gate control signal. In this example, VLANIDs are allocated communications between individual RRHs and a BBU. Upon receipt of an MFH packet from an RRH, a node (i.e., input-side edge node) connected to the RRH generates an L2 packet that includes a remote gate control signal (i.e., timing information and period information). The destination address of the L2 packet is the same as that of the MFH packet and designates the BBU. A VLANID identifying the source of the MFH packet is registered in the header of the L2 packet. The input-side edge node transmits the L2 packet toward the BBU. As a result, the L2 packet is forwarded to an output-side edge node by one or more intermediate nodes. However, the remote gate control signal is terminated by the output-side edge node and thus is not forwarded to the BBU.

Each packet switch 2 performs TAS calculation when receiving a priority packet with a VLANID registered in a calculation-target port list 41. In the example depicted in FIG. 10, "VLANID=100, 200, 300" is registered in the calculation-target port list 41 of the packet switch 2 implemented in the input-side edge node. When receiving an L2 packet that includes a remote gate control signal and is allocated a VLANID registered in a remote-control-enabled port list 42, each packet switch 2 controls the non-priority packet gate 25 according to the received remote gate control signal. In the example depicted in FIG. 10, "VLANID=100, 200, 300" is registered in the remote-control-enabled port list 42 of each of the packet switches 2 implemented in the intermediate node and the output-side edge node. In addition, when receiving an L2 packet that includes a remote gate control signal and is allocated a VLANID registered in a termination port list 43, each packet switch 2 terminates the remote gate control signal. In the example depicted in FIG. 10, "VLANID=100, 200, 300" is registered in the termination port list 43 of the packet switch 2 implemented in the output-side edge node.

In the example described above, it is decided in accordance with a VLANID whether to process a received packet. However, the invention is not limited to this method. For example, a port number identifying an input or output port may be used to decide whether to process a received packet. For example, "port number=2, 3, 10" may be registered in the calculation-target port list 41 of the packet switch 2 implemented in the input-side edge node depicted in FIG. 10. Alternatively, it may be decided according to a combination of a port number and a VLANID whether to process a received packet.

FIG. 11 illustrates an example of the hardware configuration of the packet switch 2. The packet switch 2 includes a CPU 51, a nonvolatile memory 52, a volatile memory 53, a processing module 54, and an interface card 55. However, the packet switch 2 may include other circuits that are not depicted in FIG. 11.

The CPU 51 monitors and controls the packet switch 2 by executing a program stored in the nonvolatile memory 52. The CPU 51 may monitor and control an NPU (network processing unit) and/or an ASSP (application specific standard product). The nonvolatile memory 52 stores a program for monitoring and controlling the packet switch 2. The nonvolatile memory 52 also stores information (e.g., config information) indicating the configuration of the packet switch 2. The volatile memory 53 is used as a work area for the CPU 51.

For example, the processing module 54 may include NPU and ASSP and process received packets. That is, the processing module 54 performs processes pertaining to layer 2. Specifically, the processing module 54 provides VLAN, MAC, QoS, and OAM. Note that the switch processor 12 and the plurality of packet processors 13 depicted in FIG. 2 are implemented by the processing module 54. Accordingly, the processing module 54 provides the gate control for limiting the output of non-priority packets with respect to priority packets. In this case, operations pertaining to the gate control are controlled by software. In addition, the controller 26, the collector 31, the detector 32, the gate control signal generator 34, and the gate control signal transmitter 35 may be implemented by a processor that executes a packet processing program. In this case, the packet processing program may describe processes illustrated in flowcharts of FIGS. 15-17 (explained later).

The interface card 55 includes an optical module for accommodating an optical line. The interface card 55 also includes an FPGA that controls the optical module. For example, the FPGA may control the on/off of the power of the optical module and control the on/off of optical output.

Interface cards 55 with different transmission rates may be implemented in the packet switch 2. For example, both a 10-Gbps IF card 55 and a 100-Gbps IF card 55 may be implemented.

First Example

FIG. 12 illustrates a network system in accordance with a first example. In the first example, a relay network includes packet switches SW1-SW6. The packet switches SW1-SW6 are connected in a ring by an optical fiber. The ring is duplexed. In FIG. 12, marks (L, R, D) allocated to the packet switches SW1-SW6 identify physical ports. In this example, the relay network provides Ethernet Ring Protection (ERP) (Ethernet: a registered trade mark). An ERP-based block port is provided between the packet switches SW4 and SW5.

The following descriptions are based on the assumption that priority packets are transmitted from an RRH1 and an RRH2 to a BBU. An MFH packet is an example of a priority packet. Priority packets from RRH1 and RRH2 are transmitted to BBU via HUB1, SW5, SW6, and SW1. Thus, SW5 corresponds to an input-side edge node, SW1 corresponds to an output-side edge node, and SW6 corresponds to an intermediate node. The block port blocks packets other than specified control packets. Hence, in normal operations, priority packets transmitted from RRH1 and RRH2 cannot pass through the path between SW4 and SW5.

Priority packets transmitted from RRH1 and RRH2 arrive at a port D of SW5 via HUB 1. In this example, the switch processor 12 of SW5 guides the priority packets arriving at the port D to a port L according to preset switch information. In this case, the packet processor 13 provided for the port L in SW5 performs a TAS process.

In SW5, the packet processor 13 detects the transmission pattern of priority packets to be output via the port L and creates a list table 33. The packet processor 13 also generates a remote gate control signal according to a result of the detection. Then, SW5 outputs the priority packets and the remote gate control signal via the port L. The port D is registered in the calculation-target port list 41 of SW5. Alternatively, when RRH1 and RRH2 are respectively identified as VLANID1 and VLANID2, VLANID1 and VLANID2 may be registered in the calculation-target port list 41 of SW5 as logical ports.

The priority packets and the remote gate control signal transmitted via the port L of SW5 arrive at a port R of SW6. In SW6, the switch processor 12 guides the priority packets and the remote gate control signal arriving at the port R to the port L according to preset switch information. In this case, the packet processor 13 provided for the port L in SW6 performs gate control.

In SW6, the packet processor 13 creates a remote control list table 36 based on the remote gate control signal and performs gate control. Then, SW6 outputs the priority packets and the remote gate control signal via the port L. The port R is registered in the remote-control-enabled port list 42 of SW6. Alternatively, VLANID1 and VLANID2 may be registered in the remote-control-enabled port list 42 of SW6.

The priority packets and the remote gate control signal transmitted via the port L of SW6 arrive at a port R of SW1. In SW1, the switch processor 12 guides the priority packets and the remote gate control signal arriving at the port R to the port D according to preset switch information. In this case, the packet processor 13 provided for the port D performs gate control.

In SW1, the packet processor 13 creates a remote control list table 36 based on the remote gate control signal and performs gate control. Then, SW1 outputs the priority packets via the port D. Thus, the priority packets transmitted from RRH1 and RRH2 are guided to BBU. The port R (or VLANID1 and VLANID2) is registered in the remote-control-enabled port list 42 of SW1. The port R (or VLANID1 and VLANID2) is registered in the termination port list 43 of SW1. Accordingly, the remote gate control signal is not forwarded to BBU and terminated by SW1.

FIGS. 13A and 13B illustrate examples of the list tables 33 created by SW5 in the example depicted in FIG. 12. In this instance, the packet processor 13 provided for the port L detects, for each VLANID, the transmission pattern of priority packets. A list table depicted in FIG. 13A is created for VLANID1 (i.e., communication between RRH1 and BBU), and a list table depicted in FIG. 13B is created for VLANID2 (i.e., communication between RRH2 and BBU). In this case, the packet processor 13 provided for the port L closes the non-priority packet gate 25 in time slots TS3-TS4 so as to forward priority packets allocated VLANID1 and closes the non-priority packet gate 25 in time slots TS5-TS6 so as to forward priority packets allocated VLANID2.

Accordingly, the packet processor 13 creates, for packets to be output via the port L, a list table depicted in FIG. 14 according to the list tables depicted in FIGS. 13A and 13B. The list table depicted in FIG. 14 is obtained by performing an OR operation pertaining to the state information for the non-priority packet gate in the list tables depicted in FIGS. 13A and 13B. In the OR operation, "Close" corresponds to "1", and "Open" corresponds to "0".

Subsequently, the packet processor 13 controls the non-priority packet gate 25 in accordance with the list table depicted in FIG. 14. Thus, the non-priority packet gate 25 is closed in time slots TS3-TS6. The packet processor 13 also generates a remote gate control signal indicating the information contained in the list table depicted in FIG. 14. The remote gate control signal is transmitted following the transmission of corresponding priority packet.

FIG. 15 is a flowchart illustrating an example of a packet reception process. The processes of this flowchart are performed when the packet processor 13 receives a packet.

In S1, the packet processor 13 decides whether a received packet is a priority packet. For example, a VLANID allocated to the received packet may be used to decide whether the received packet is a priority packet. When the received packet is a priority packet, the packet processor 13 stores the received packet in the priority packet queue 22 in S2.

In S3, the packet processor 13 decides whether TAS calculation is to be performed for the source of the received priority packet. In this example, the source is identified in accordance with a physical port that the priority packet has arrived at or a logical port such as the VLANID. In this case, when the VLANID or the physical port that the priority packet has arrived at is registered in the calculation-target port list 41, it is decided that TAS calculation is to be performed for the priority packet.

In S4, the packet processor 13 performs TAS calculation for the priority packet. In particular, the packet processor 13 detects the transmission pattern of the priority packet with respect to the source. However, the transmission pattern of the priority packet is obtained by collecting statistical information over a specified period, as described above by referring to FIG. 6. In S5, the packet processor 13 stores a result of the TAS calculation in the list table 33 with respect to the ID of the source of the priority packet.

When the received packet is not a priority packet, the packet processor 13 decides in S6 whether the received packet is a remote gate control signal. For example, a VLANID allocated to the received packet may be used to identify whether the received packet is a remote gate control signal. When the received packet is a remote gate control signal, the packet processor 13 stores the remote gate control signal in the priority packet queue 22 in S7.

In S8, the packet processor 13 decides whether to perform gate control in accordance with the received remote gate control signal. In this example, when the physical port that the remote gate control signal has arrived at or the VLANID allocated to this signal is registered in the remote-control-enabled port list 42, the packet processor 13 decides to perform the gate control in accordance with the received remote gate control signal. In this case, the packet processor 13 updates the remote control list table 36 in accordance with the received remote gate control signal in S9. When the received packet is neither priority packet nor a remote gate control signal, the received packet is stored in the non-priority packet queue 23 in S10.

In the example depicted in FIG. 12, "port D" or "VLANID1, VLANID2" is registered in the calculation-target port list 41 of SW5 as the source of received priority packets. Thus, when priority packets are transmitted from RRH1 or RRH2, the packet processor 13 provided for the port L of SW5 performs the processes of S2-S5. In particular, SW5 calculates the transmission pattern of the priority packets. In SW6 and SW1, by contrast, "port R" or "VLANID1, VLANID2" is not registered in the calculation-target port lists 41. Hence, neither SW6 nor SW1 performs the processes of S4-S5. That is, neither SW6 nor SW1 performs TAS calculation.

Figure 16:
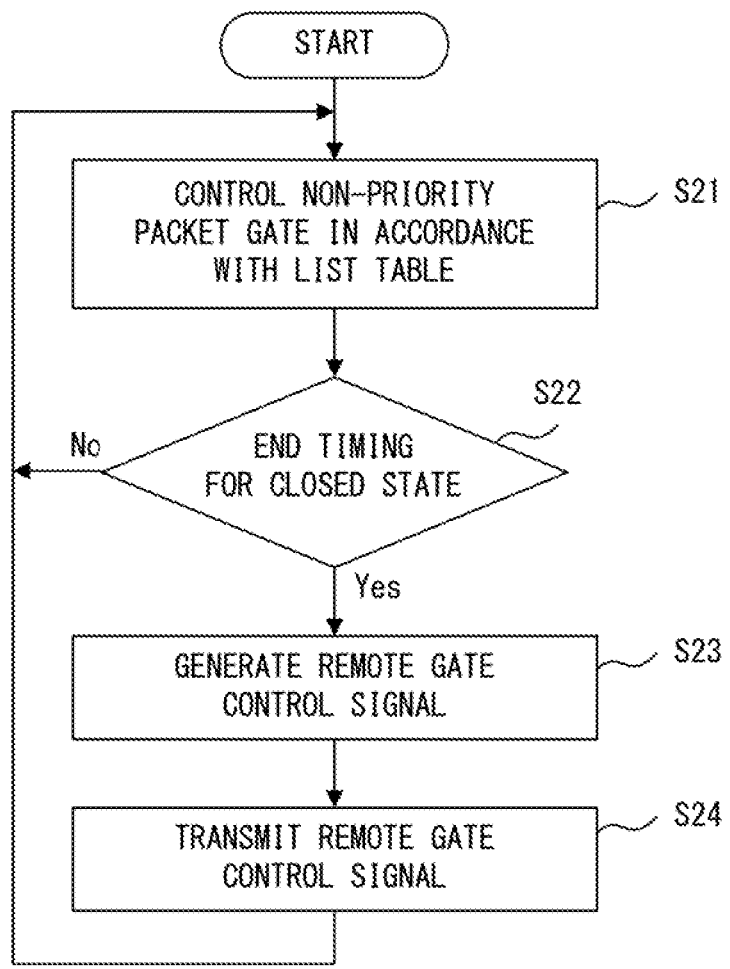
FIG. 16 is a flowchart illustrating an example of a process of transmitting a remote gate control signal.

FIG. 16 is a flowchart illustrating an example of a process of transmitting a remote gate control signal. The processes of this flowchart are performed by an input-side edge node. In the example depicted in FIG. 12, SW5 performs these processes. Assume that the input-side edge node has already created a list table 33 through the processes of the flowchart depicted in FIG. 15.

In S21, the packet processor 13 provided for the output port for priority packets controls the non-priority packet gate 25 in accordance with the list table 33. In S22, the packet processor 13 decides whether the current time is an end timing for the closed state of the non-priority packet gate 25. In the example depicted in FIG. 14, for example, the closed state of the non-priority packet gate 25 may end at time slot TS6. The processes of S23-S24 are performed when the current time is an end timing for the closed state.

In S23, the packet processor 13 generates a remote gate control signal based on the list table 33. In this example, the remote gate control signal includes timing information indicating a timing for starting the next closed state and period information indicating a period for the next closed state. For example, the remote gate control signal may be created in the time slot TS6 depicted in FIG. 14. In this case, the next closed state will start at the time slot TS3 for the next subframe and last for 280 microseconds. Accordingly, the timing information indicates "after 720 microseconds", and the period information indicates "280 microseconds". The timing information may be represented by a time slot number. The period information may be represented by the number of time slots.

In S24, the packet processor 13 transmits the remote gate control signal. The remote gate control signal is transmitted at the end of the period in which the non-priority packet gate 25 is closed. The remote gate control signal is stored in a packet and transmitted. The header information (e.g., destination address) of this packet is the same as those of corresponding priority packets. However, the header information of this packet preferably includes information indicating the remote gate control signal.

Nodes (intermediate node and output-side edge node) other than the input-side edge node perform gate control in accordance with a remote control list table 36. The remote control list table 36 is updated according to the remote gate control signal transmitted from the input-edge node. Assume, for example, that the input-side edge node has transmitted "timing information: after 720 microseconds" and "period information: 280 microseconds" in time slot TS6. In this case, a node that receives the remote gate control signal in time slot TS6 determines that the non-priority packet gate 25 will start to be closed in a time slot 720 microseconds after time slot TS6 (i.e., in the TS3 for the next subframe) and the period of this closed state will be 280 microseconds. Accordingly, "close" is set for time slots TS3-TS6 in the remote control list table 36 of the node that has received the remote gate control signal.

Figure 17:
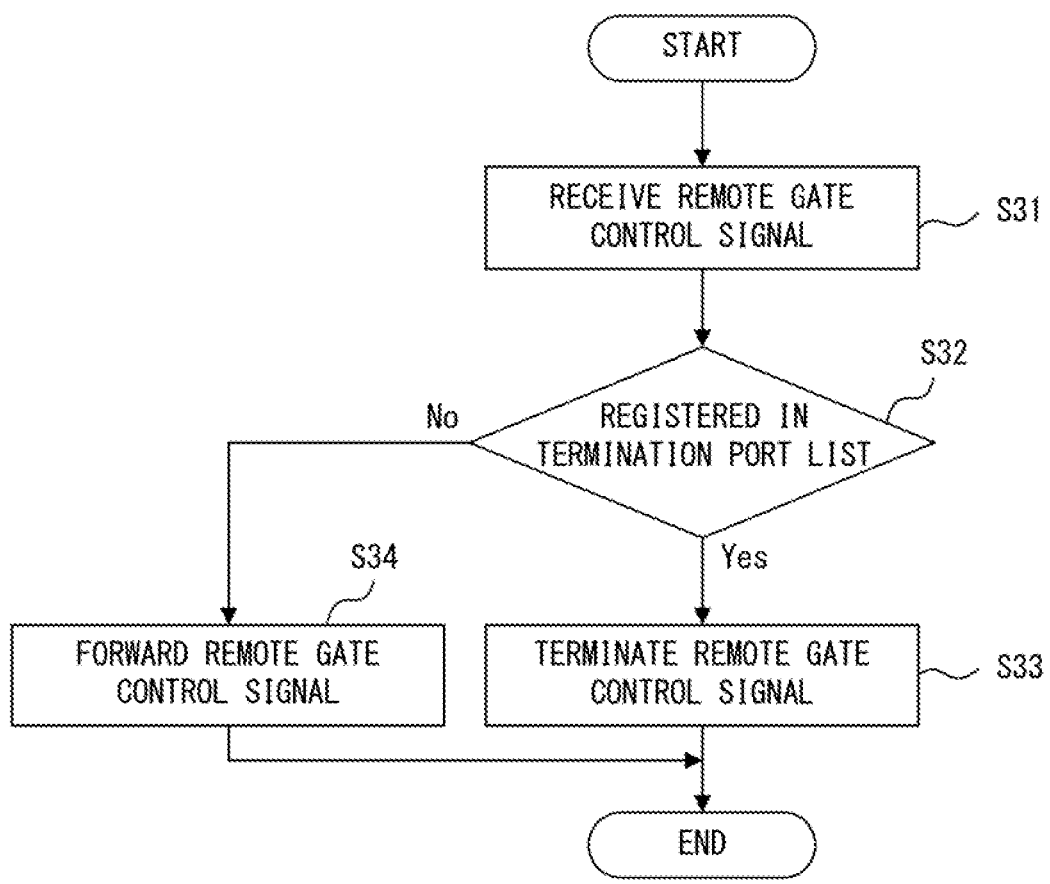
FIG. 17 is a flowchart illustrating an example of a process of terminating a remote gate control signal.

FIG. 17 is a flowchart illustrating an example of a process of terminating a remote gate control signal. The processes of this flowchart are performed by a node that has received a remote gate control signal. In the example depicted in FIG. 12, SW6 and SW1 perform these processes.

In S31, the packet processor 13 receives a remote gate control signal. In S32, the packet processor 13 decides whether to forward or terminate the received remote gate control signal. When the physical port that the remote gate control signal has arrived at or the VLANID allocated to this signal is registered in the termination port list 43, the packet processor 13 terminates the remote gate control signal in S33. When the physical port that the remote gate control signal has arrived at or the VLANID allocated to this signal is not registered in the termination port list 43, the packet processor 13 outputs (i.e., forwards) the remote gate control signal in S34. In the example depicted in FIG. 12, the packet processor 13 provided for the port L of SW6 forwards remote gate control signals transmitted from RRH1 and RRH2 to SW1. The packet processor 13 provided for the port D of SW1 terminates remote gate control signals transmitted from RRH1 and RRH2.

Second Example

FIG. 18 illustrates a network system in accordance with a second example. FIG. 18 indicates the network after a network fault occurs between SW1 and SW6 in FIG. 12. When the network fault occurs, the ERP-based block port depicted in FIG. 12 is opened to perform route switching. In the route switching, the switch processor 12 in each SW changes paths in the device. For example, in SW5, a packet arriving at the port D may be guided to the port R. In each of SW4, SW3, and SW2, a packet arriving at the port L is guided to the port R. In SW1, a packet arriving at the port L is guided to the port D. As a result, priority packets transmitted from RRH1 and RRH2 are forwarded to the BBU via SW5, SW4, SW3, SW2, and SW1.

FIGS. 19A and 19B illustrate examples of operations performed by an input-side edge node when route switching is carried out. The following describes operations of SW5 depicted in FIGS. 12 and 18.

As depicted in FIG. 19A, SW5 is configured to guide, before route switching, priority packets arriving at the port D to the port L. Thus, a packet processor 13L provided for the port L detects the transmission pattern of the priority packets by performing TAS calculation. The packet processor 13L creates the list table 33 according to a result of the TAS calculation.

When the network fault depicted in FIG. 18 occurs, the switch processor 12 in each SW changes a path in the device. As depicted in FIG. 19B, the switch processor 12 in SW5 is configured to guide priority packets arriving at the port D to the port R. Assume that RRH1 and RRH2 transmit priority packets in the same transmission pattern as that before the occurrence of the network fault. In this case, the list table 33 created by the packet processor 13L before the occurrence of the network fault will also be effective after the route switching. Accordingly, in SW5, the list table 33 created by the packet processor 13L is set for the packet processor 13R. Then, the packet processor 13R performs gate control using the list table 33 received from the packet processor 13L. The packet processor 13R also generates a remote gate control signal by using the list table 33 received from the packet processor 13L and transmits the generated signal.

As described above, the packet switch 2 implemented in the input-side edge node sets the list table 33 created before route switching for the packet processor 13 provided for the output port after the route switching (port R in the examples depicted in FIGS. 19A and 19B). Accordingly, the packet switch 2 can continue gate control without delay even when route switching occurs due to a network fault or the like.

Without copying a list table 33 as depicted in FIGS. 19A and 19B, a packet processor (packet processor 13R in the examples depicted in FIGS. 19A and 19B) provided for a new output port may create a list table 33 by collecting statistical information of priority packets. However, a long time will be needed to collect statistical information. Thus, in a procedure for newly creating a list table after route switching, gate control could be delayed when a network fault occurs. Alternatively, priority packets and non-priority packets could collide against each other.

The packet switch 2 implemented in an intermediate node or an output-side edge node receives a remote gate control signal following reception of priority packets. The packet switch 2 performs gate control based on the received remote gate control signal. Accordingly, the packet switch 2 of each node can continue gate control without delay even when route switching occurs due to a network fault or the like.

In the examples depicted in FIGS. 12-19B, priority packets are transmitted from RRH1 and RRH2 to the BBU. However, the invention is also applicable to cases in which priority packets are transmitted from a BBU to an RRH. In the example of FIG. 12, SW1 may be operated as an input-side edge node when priority packets are transmitted from the BBU to RRH1 and RRH2. Thus, SW1 detects the transmission pattern of the priority packets and creates a list table 33. A remote gate control signal indicating the information contained in the list table 33 is also sent from SW1 to SW6 and SW5.

Third Example

As described above, the packet switch 2 detects the transmission pattern of priority packets and performs gate control in accordance with a result of the detection. In particular, the packet switch 2 estimates the transmission pattern of priority packets and limits output of non-priority packets in accordance with a result of the estimation.

However, priority packets are not necessarily transmitted as estimated. In particular, a priority packet may arrive at the packet switch 2 while the non-priority packet gate 25 is open. A priority packet arriving at the packet switch 2 while the non-priority packet gate 25 is open could lead to a delay in the forwarding of the priority packet due to the forwarding of non-priority packets. Accordingly, the packet switch 2 determines a period for closing the non-priority packet gate 25 (hereinafter referred to as a gate close period) according to the transmission pattern of priority packets and sets a margin period M for the gate close period. Note that the non-priority packet gate 25 is closed during the margin period.

Figure 20:
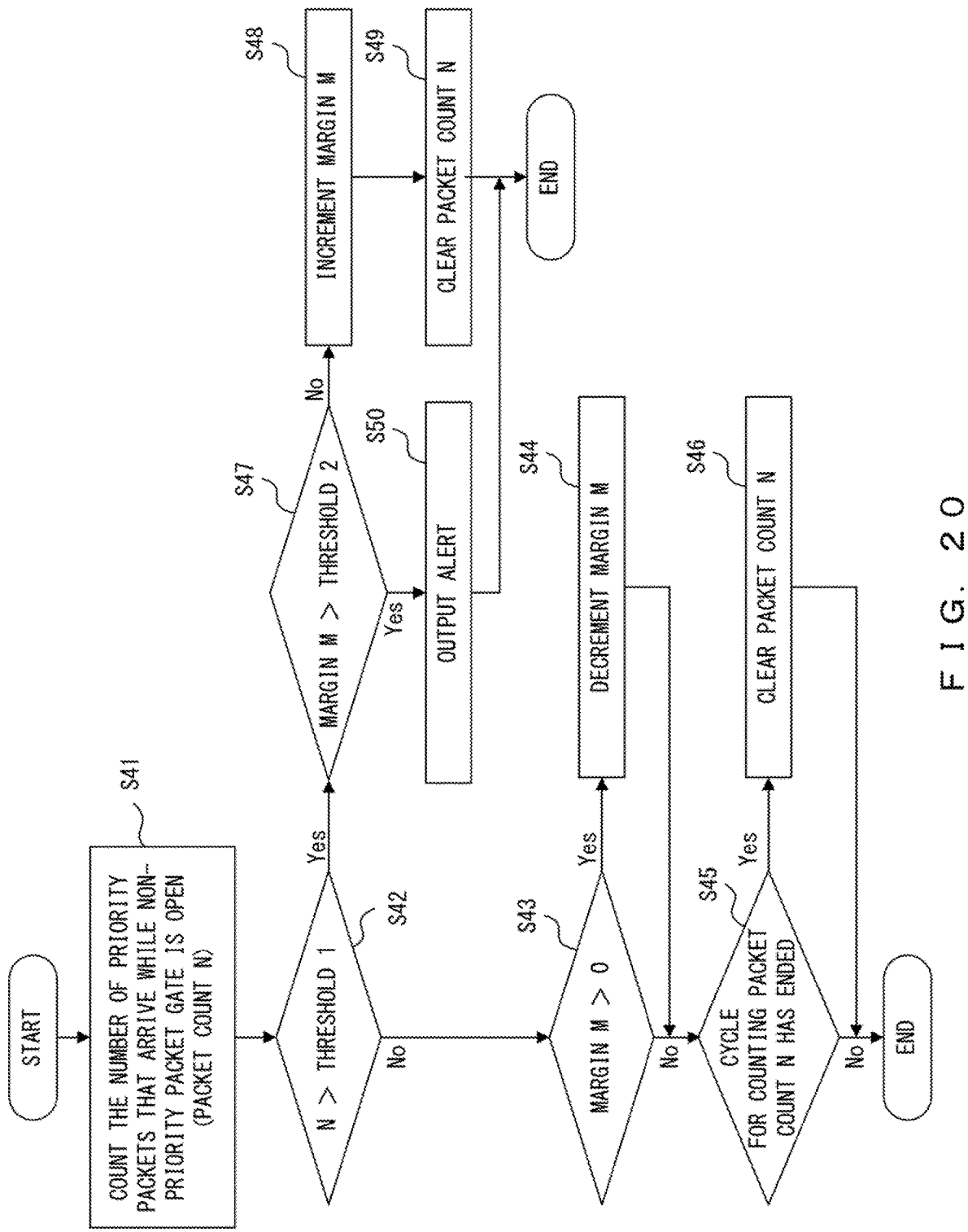
FIG. 20 is a flowchart illustrating an example of a method for adjusting a margin period added to a gate close period.

FIG. 20 is a flowchart illustrating an example of a method for adjusting a margin period added to a gate close period. For example, the processes of this flowchart may be performed by an input-side edge node.

In S41, the packet processor 13 counts the number of priority packets that arrive at the packet switch 2 during a period in which the non-priority packet gate 25 is open. A period in which the non-priority packet gate 25 is open may hereinafter be referred to as a "gate open period". The number of priority packets counted in S41 may be referred to as a "packet count N".

In S42, the packet processor 13 compares the packet count N with a specified threshold 1. When the packet count N is smaller than or equal to the threshold 1, the packet processor 13 checks in S43 whether the margin period M is zero. When the margin period is greater than zero, the packet processor 13 decrements the margin period M by a specified amount in S44. When the margin period is zero, S44 is skipped.

In S45, the packet processor 13 decides whether a cycle for counting the packet count N has ended. When the cycle has ended, the packet processor 13 clears the packet count N in S46. In particular, the packet count N is initialized and set to zero.

When the packet count N is larger than the threshold 1 (S42: Yes), the packet processor 13 compares the margin period M with a specified threshold 2 in S47. When the margin period M is less than or equal to the threshold 2, the packet processor 13 increments the margin period M by a specified amount in S48. The packet processor 13 clears the packet count N in S49. When the margin period M is greater than the threshold 2, the packet processor 13 outputs an alert in S50.

The list table 33 is updated when the margin period M has changed in the above-described processes. Assume, for example, that a gate close period determined according to the transmission pattern of priority packets is time slots TS3-TS5 and a margin period has not been established yet. When the number of priority packets that arrive at the packet switch 2 while the non-priority packet gate 25 is open (i.e., packet count N) is larger than the threshold 1, the margin period M is incremented in S48. As an example, the margin period M may be incremented from zero to 1. In this case, the time slots TS2 and TS6 in the list table 33 are updated from "open" to "close". After this, the controller 26 controls and maintains the non-priority packet gate 25 in the closed state during time slots TS2-TS6.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A network system that transmits priority packets and non-priority packets having a lower priority than the priority packets, wherein
 a packet processing device is implemented in each node of the network system,
 the packet processing device includes
  a packet storage that stores non-priority packets,
  a gate that is provided on an output side of the packet storage, and
  a controller that controls the gate,
 an edge node packet processing device is implemented in an edge node of the network system,
 the edge node packet processing device further includes
  a processor that detects a transmission pattern of the priority packets and generates a gate control signal based on the transmission pattern of the priority packets, and
  a transmitter that transmits the gate control signal to a destination of the priority packets,
 in the packet processing device that receives the gate control signal, the controller controls the gate according to the gate control signal, and
 the transmitter of the edge node packet processing device transmits the gate control signal at an end of a period in which the gate is closed and each packet processing device that receives the gate control signal forwards the gate control signal at an end of a period in which the gate is closed.

2. The network system according to claim 1, wherein the transmission pattern indicates intervals at which priority packets arrive at the edge node and a packet amount of priority packets that have arrived at the edge node.

3. The network system according to claim 1, wherein the gate control signal indicates a timing for starting to close a gate of another packet processing device and a period of closing the gate of the other packet processing device.

4. A network system that transmits priority packets and non-priority packets having a lower priority than the priority packets, wherein
 a packet processing device is implemented in each node of the network system,
 the packet processing device includes
  a packet storage that stores non-priority packets,
  a gate that is provided on an output side of the packet storage, and
  a controller that controls the gate,
 an edge-node packet processing device is implemented in an edge node of the network system,
 the edge-node packet processing device further includes
  a processor that detects a transmission pattern of the priority packets and generates a gate control signal based on the transmission pattern of the priority packets, and
  a transmitter that transmits the gate control signal to a destination of the priority packets,
 in the packet processing device that receives the gate control signal, the controller controls the gate according to the gate control signal, and wherein
 the edge-node packet processing device further includes a first port, a second port, and a third port,
 a first packet processor and a second packet processor are respectively provided for the first port and the second port in the edge-node packet processing device,
 each of the first packet processor and the second packet processor includes the packet storage, the gate, the controller, the processor, and the transmitter,
 when the edge-node packet processing device outputs, via the first port, priority packets that have arrived at the third port, information indicating the transmission pattern of the priority packets that has been obtained by the processor of the first packet processor is stored in a memory provided for the first packet processor, and
 when the edge-node packet processing device switches a port for outputting priority packets that have arrived at the third port from the first port to the second port, the second packet processor is configured such that
  the controller controls the gate by using the information stored in the memory, and
  the processor generates the gate control signal by using the information stored in the memory.

5. A packet processing device implemented in a network that transmits priority packets and non-priority packets having a lower priority than the priority packets, the packet processing device comprising:
 a packet storage that stores non-priority packets;
 a gate that is provided on an output side of the packet storage;
 a controller that controls the gate;
 a processor that detects a transmission pattern of the priority packets and generates, based on the transmission pattern of the priority packets, a gate control signal for controlling a gate of a packet processing device implemented in another node; and
 a transmitter that transmits the gate control signal to a destination of the priority packets, wherein
 the transmitter transmits the gate control signal at an end of a period in which the gate is closed.

* * * * *